(12) United States Patent
Green

(10) Patent No.: US 6,192,346 B1
(45) Date of Patent: *Feb. 20, 2001

(54) VACATIONS AND HOLIDAY SCHEDULING METHOD AND SYSTEM HAVING A BIDDING OBJECT WHICH ENABLES EMPLOYEES TO BID AND PREVENT FROM BIDDING IF HIGHER PRIORITY EMPLOYEES HAVE NOT BID

(75) Inventor: Edwin Elliot Green, Miami, FL (US)

(73) Assignee: IEX Corporation, Richardson, TX (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/484,207

(22) Filed: Jun. 8, 1995
(Under 37 CFR 1.47)

(51) Int. Cl.[7] .................................................. G06F 17/60
(52) U.S. Cl. ................................................... 705/9; 705/11
(58) Field of Search ........................... 364/401, 401 R, 364/493; 705/9, 11

(56) References Cited

U.S. PATENT DOCUMENTS

| | | | |
|---|---|---|---|
| 4,213,182 | * 7/1980 | Eichelberger et al. | 364/493 |
| 5,182,705 | * 1/1993 | Barr et al. | 364/401 |
| 5,289,368 | 2/1994 | Jordan et al. | |
| 5,557,515 | * 9/1996 | Abbruzzese et al. | 364/401 R |

OTHER PUBLICATIONS

Vacation: A Microcomputer Based Scheduling tool. Sujiit Das and Robert A. Whitaker, Apr. 26, 1987.*

The Numbers approach to nursing Management. Hal Finlayson in Dimensions in Health, May 1976.*

Vacation, A Microcomputer Based Scheduling Tool. Sujit Das and Robert A. Whittaker, Apr. 24, 1987.*

Using microcomputer spreadsheets to teach industrial and labor relations applications. Jhon Lund, Labor Studies Journal, v20, n2, p22(16), Summer 1995.*

Casino hits jackpot with employee scheduling software. Joy Cohan, Personal Journal Marketplace Supplement, pp: 8, May 1993.*

Path Systems Release New Software To Administer Policies For Paid Time Off. Path Systems. Scotts Valley, CA. Jun. 9, 1988.*

* cited by examiner

Primary Examiner—Allen R. MacDonald
Assistant Examiner—M. Irshadullah
(74) Attorney, Agent, or Firm—David H. Judson

(57) ABSTRACT

The present invention provides a vacation and holiday scheduling system. The system includes a variety of objects to assist a business in controlling and managing the scheduling of vacations by their employees and for assisting the employees in bidding on vacation days and holidays based upon employee seniority.

20 Claims, 5 Drawing Sheets

| Management Unit | | Hours | To obtain help for a specific column use the right mouse button | | | | | |
|---|---|---|---|---|---|---|---|---|
| Agnt Nmbr | Agent Name | Sen Date | Sen Date Ext | Password | Work Week 1 Shift | | Work Week 1 Days |
| 1009 | Carlson, Charles | 06/22/92 | 2010 | | Day Shift | ▽ | 5 |
| 1032 | Smith, Ron | 12/15/94 | 2426 | | Day Shift | ▽ | 5 |
| 1038 | Murray, Phil | 07/13/92 | 2471 | | Day Shift | ▽ | 5 |
| 1046 | Goble, Charles | 03/01/87 | 2549 | | Day Shift | ▽ | 5 |
| 1061 | Palmer, Palmer | 09/01/93 | 2630 | | Day Shift | ▽ | 5 |
| 1063 | Ehlich, Janet | 09/01/93 | 2632 | | Day Shift | ▽ | 5 |
| 1064 | Chester, Marlene | 08/25/93 | 2636 | | Day Shift | ▽ | 5 |
| 1065 | Kovak, Mark | 09/01/93 | 2638 | | Day Shift | ▽ | 5 |
| 1066 | Mohler, Erica | 09/01/93 | 2640 | | Day Shift | ▽ | 5 |
| 1067 | Stewart, Chris | 08/09/93 | 2643 | | Day Shift | ▽ | 5 |
| 1068 | Rickles, Ted | 09/01/93 | 2644 | | Day Shift | ▽ | 5 |
| 1069 | Spelling, Mike | 08/22/93 | 2645 | | Day Shift | ▽ | 5 |
| 1364 | Banner, Mickey | 12/15/94 | 2364 | | Day Shift | ▽ | 5 |
| Totals | | | | | | | |

FIG. 5

| Summary | Calendar | Utilities |
|---------|----------|-----------|

Vacation/Holiday Bidding

Goble, Charles
01/01/94 to 12/31/94  Day Shift  08:00am to 05:00pm
5 days by 8 hours  Su Mo Tu We Th Fr Sa

| Description | Totals | Selected | Item | Taken | Rem |
|---|---|---|---|---|---|
| Vacation Days | 27.00 | 26.00 | 1.00 | 0.00 | 27.00 |
| Holidays | 8.00 | 0.00 | 8.00 | 0.00 | 8.00 |
| Alternate Vacation Days | 5.00 | 4.00 | 1.00 | 0.00 | 5.00 |

| Holiday Date | Description | Req | Volunteers | Not Work | Forced Agents |
|---|---|---|---|---|---|
| 01/03/94 | | 94 | 2 | 1 | 92 |
| 05/30/94 | | 12 | 3 | 0 | 9 |
| 07/04/94 | | 81 | 1 | 2 | 80 |
| 09/05/94 | | 70 | 2 | 1 | 68 |

FIG. 6

VACATIONS AND HOLIDAY SCHEDULING METHOD AND SYSTEM HAVING A BIDDING OBJECT WHICH ENABLES EMPLOYEES TO BID AND PREVENT FROM BIDDING IF HIGHER PRIORITY EMPLOYEES HAVE NOT BID

TECHNICAL FIELD

This invention relates generally to computerized systems and methods of planning, scheduling and managing vacations and holidays in a business environment.

BACKGROUND OF THE INVENTION

Scheduling management systems for use in planning, scheduling and managing personnel are known in the prior art. Such systems typically include a basic scheduling capability to enable a business to forecast future needs and then allocates agent work hours according to the staffing requirements that have been forecast. Prior art vacation and holiday scheduling systems used with such scheduling management systems suffer from many disadvantages. Such systems rely on conventional time series forecasting techniques to generate forecasts for a large block or unit of time, e.g., a month. These techniques use fixed factors to decompose the monthly forecast into weekly, daily, and then hourly or smaller increments. This approach is computationally efficient but lends itself to accuracy only on a macro scale, e.g., month-to-month, as opposed to reflecting real changes in the business needs as they actually occur. Prior art systems thus do not have the flexibility to be responsive to changing conditions to forecast work loads and provide realistic scheduling of personnel to meet the dynamic requirements of the business.

Moreover, prior art systems are typically structured around a single business location, thus ignoring the needs of multi-site facilities. Another disadvantage associated with prior art approaches is with the inability of such systems to efficiently generate optimal work shifts for available agents when forecasting is complete. Further, these systems do not have the capability to efficiently generate schedules to satisfy agent preferences, availability and seniority. Thus, a need has arisen for a vacation scheduling system enabling the scheduling of agent vacations over a number of site locations and allowing all needs of a business to be efficiently met.

BRIEF SUMMARY OF THE INVENTION

The present invention overcomes the foregoing and other problems with a vacation and holiday scheduling system. The vacation and holiday scheduling system of the present invention includes a variety of objects enabling a business to control and manage the scheduling of vacations and holidays by their employees. An administration object enables a user to set up the conditions and rules by which the vacation and holiday scheduling system will function. A plan object enables the determination of business unit and management unit staffing requirements for a particular business. These requirements are able to be downloaded from a remote force management system or may be generated locally. A calculate vacation days object enables the system to determine the number of vacation days which have been earned by each agent within a business unit. The agent information and vacation days calculated are displayed via a vacation profile object which gives complete information concerning the vacation requirements and selections of each employee. Finally, a bidding object allows employees of a business to access the vacation and holiday planning system and select available holiday and vacation periods on a seniority basis. An employee selects his/her name from an agent listing and is allowed access if each individual senior to him/her has already selected his/her vacation and holiday requirements. Upon entry and approval of a personal password, the employee may access selection utilities to assist in selecting preferred vacations and holidays.

The foregoing has outlined some of the more pertinent aspects of the present invention. These aspects should be construed to be merely illustrative of some of the more prominent features and applications of the invention. Many other beneficial results can be attained by applying the disclosed invention in a different manner or modifying the invention as will be described. Accordingly, other aspects and a full understanding of the invention may be had by referring to the following detailed description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 5 is a representation of the Agent Vacation Profile screen;

FIG. 6 is a diagram of the Vacation Holiday Bidding screen; and

DETAILED DESCRIPTION

Figure 1:
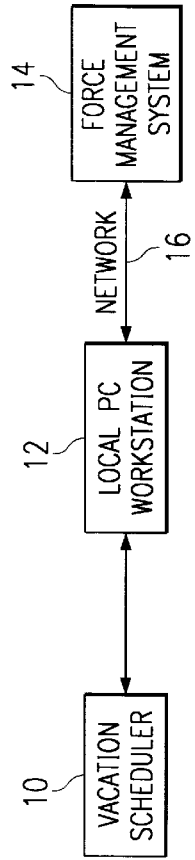
FIG. 1 is a functional block diagram illustrating how the vacation scheduler of the present invention is implemented with a PC workstation and a force management system.

Referring now to the drawings and more particularly the FIG. 1 there is illustrated a functional block diagram of the operating environment of the vacation and holiday scheduling system (vacation scheduler) 10 of the present invention. The vacation scheduler 10 is designed to be accessed by a single user to enable selection of vacation days and holidays while enabling an employer to maintain control of employee staffing requirements such that all positions for any particular day or during any particular time period are covered. The vacation scheduler 10 is locally stored within a PC workstation 12 or may be accessed via a network 16. Data required by the vacation scheduler 10 is locally stored at the PC workstation 12.

The vacation scheduler 10 is designed as a stand-alone mechanism not requiring the use of a force management system 14 in order to carry out its functionalities. However, the vacation scheduler 10 may be utilized in conjunction with a force management system such as described in applicant's U.S. Pat. No. 5,289,368. The force management system 14 may be accessed by the local PC workstation 12 via a modem or other type of network 16. For purposes of this discussion the Applicant incorporates herein by reference the disclosure contained within U.S. Pat. No. 5,289,368. Data required for generating the vacation schedules of various agents (employees of a business) are transmitted from the force management system 14 in response to user requests. Generated vacation schedule data may also be uploaded to the force management system 14 over a network 16 after generation by the vacation scheduler 10.

Figure 2:
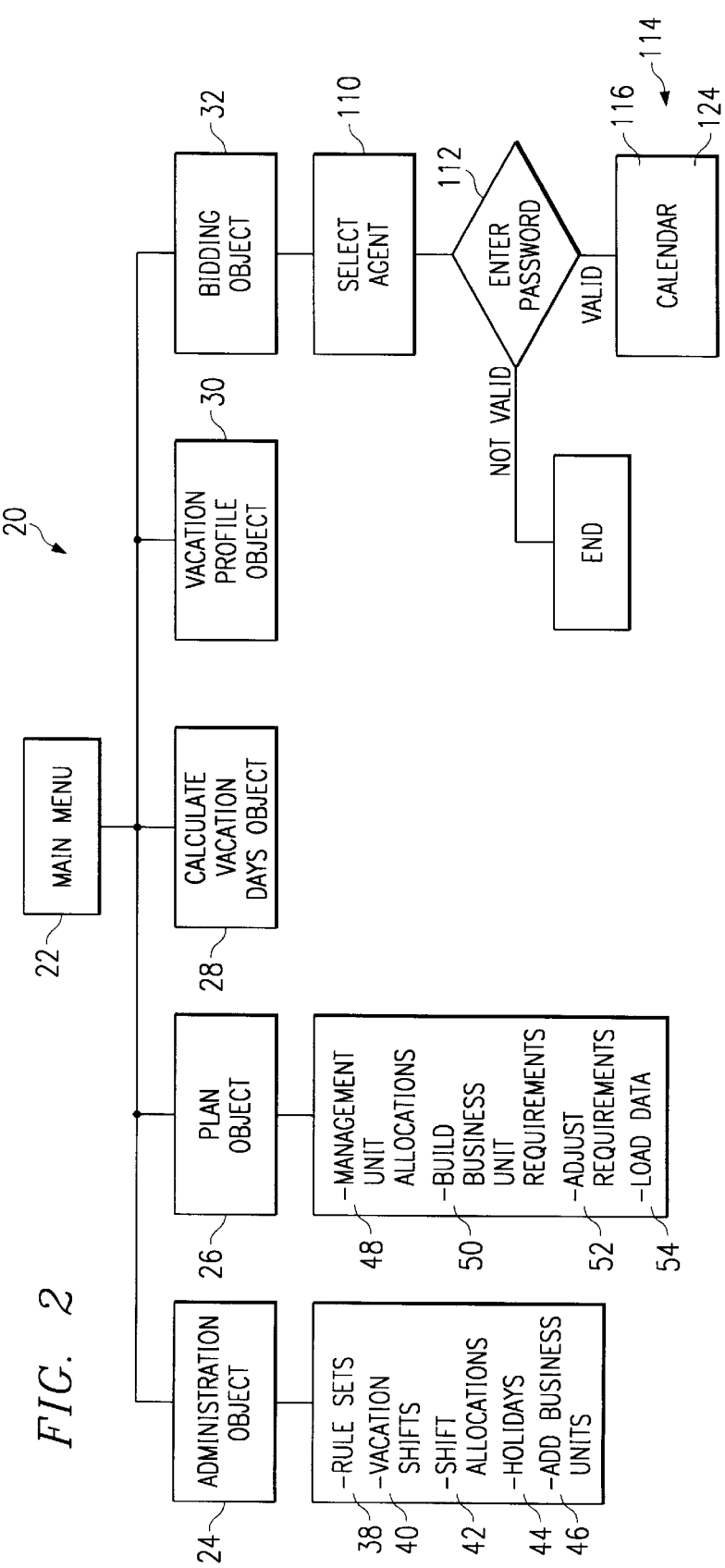
FIG. 2 is a functional flow diagram of the vacation scheduling system of the present invention.

Referring now to FIG. 2, there is illustrated a functional flow diagram of the vacation scheduler 10. The functionality of the vacation scheduler 10 is accessed via a graphical user interface 20. The graphical user interface 20 is preferably a windows-type interface enabling user access to the various system functionalities via point and click techniques. However, it should be realized that the present invention is not limited to the use of a windows-type graphical user interface and may also function equally well using a DOS or other type of user interface. The main menu 22 presents a user with a number of vacation scheduler objects including the administration object 24, plan object 26, calculate vacation days object 28, vacation profile object 30 and bidding object 32.

The administration object 24 enables the user to set up how the vacation scheduler 10 will control processing of vacation scheduling requests and data. With the administration object 24, the user is able to determine which management units (MUs) will be included in the vacation scheduler database, to initialize vacation and holiday data, and to set rules and parameters governing the behavior of the vacation scheduler. A management unit is a grouping or department of employees of a business such as sales, marketing, etc. The administration object 24 provides a number of functional tools to the user. The rules set function 38 provides for generation of sets of parameters and rules that are assigned to one or more management units. These parameters and rules determine how the vacation scheduler handles scheduling of vacation days and holidays for the management units. Each management unit has its own individual rule and parameter set. Examples of rule sets or parameters associated with a management unit would include MU010 has ten paid holidays, and MU011 has eleven paid holidays. The rules sets generally comprise anything to do with the defining or controlling of how a particular agent may take or use a holiday or vacation day.

The shift allocations function 40 and vacation shifts function 42 are used in conjunction to determine the number of vacation hours allowed from data supplied by the calculate vacation days object 28. Each agent of a management unit is assigned to a vacation shift using the vacation shifts function 42. The vacation shifts function 42 defines the various working shifts occurring throughout the work day from which a vacation may be taken. A vacation shift is defined by a shift name, shift start time and shift end time. For example, the morning shift may be defined as beginning at 6:00 a.m. and ending at 2:00 p.m., whereas the day shift may be defined as beginning at 8:00 a.m. and ending at 5:00 p.m. and the afternoon shift may be defined as beginning at 11:00 a.m. and ending at 7:00 p.m. The shift name and starting and ending times are defined using selection blocks or pop-up windows that appear in response to selection of the vacation shifts function. The shift allocation function 40 enables the establishment of peak requirements and percentage of total workload for the day for each half-hour time period during the workday. This information is useful in determining the number of vacation hours which are allowed during the vacation/holiday bidding process. As with the vacation shift function 42, the required data is entered via user selected blocks or pop-up windows.

The holidays function 44 allows the user to define the holidays which are or are not recognized by the business utilizing the system. The user is able to select holidays and associate them with particular management units on a selective basis. Thus, each management unit need not have the same assigned holidays. The holidays function 44 enables a user to set the holiday date; the day of the week on which the holiday occurs; a description of the holiday, such as Christmas Day, Halloween, etc.; and an indication of whether or not the office is open on the particular holiday. Finally, the add business units (8u) function 46 enables a user to enter business unit data, business unit teams, business unit management units, and business unit agents into the vacation scheduler database.

The plan object 26 allows for the generated staffing plan requirements downloaded from force management system 14 to be altered by the user for purposes of determining vacation planning schedules. The staffing plan may be altered using the MU allocations function 48, the build BU requirements function 50, the adjust requirements function 52, or the load data function 54. The load data function 54 downloads employee requirements from force management system 14. The user is provided with the option of downloading data of several different types. These data types include long-term forecast data providing daily staffing requirements for periods six months or further in the future, active forecast data for current through six months daily staffing requirements, and actual staffing requirements data for meeting staffing requirements for past time periods when a vacation plan is prepared for the current year. The adjust requirements function 52 enables a user to adjust the daily staffing requirements which have been downloaded by the vacation scheduler. These staffing requirements may be changed for either the long-term forecast data, active forecast data or actual data.

The build BU requirements function 50 provides the user with the capability for generating long-term, active, or actual and average forecast data for specific dates to determine the BU's forecasted staffing requirements. The MU allocations function 48 enables the user to allocate the BU requirements established by the build BU requirements function 50 to each MU within the BU. During allocation to the management units, the business unit requirements, MU hours of operation, number of agents available each day and available holidays are all considered factors. From the MU allocation function 48, the user may generate management unit allocations, indicate the open and closed status of management units during particular holidays and adjust management unit allocations that have been generated.

Figure 3:
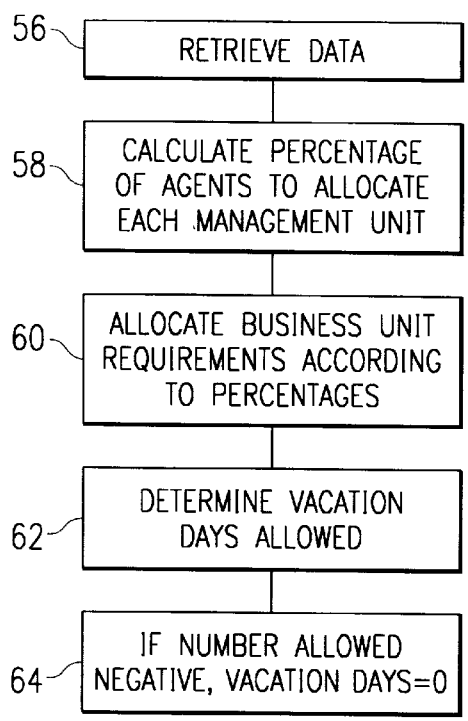
FIG. 3 is a flow chart illustrating the method for generation of management unit allocations.

Referring now to FIG. 3, there is illustrated a flow chart describing the method for generating management unit allocations. Initially, a variety of data necessary for calculating the number of available vacation days and allocating agent resources is retrieved at step 56. This data includes the business unit staffing requirements for each calendar day of a vacation year, the staffing requirements for each management unit within the business unit for each day of the calendar year, the hours of operation for each management unit, and the total number of available agents for each day of the vacation year. The percentage of available agents which must be allocated to each management unit to meet the requirements for each management unit throughout the vacation year is calculated at step 58. The available business unit requirements are allocated at step 60 to the management units according to the calculated percentages. The number of vacation days allowed is calculated by subtracting at step 62 the number of agents available from the total management unit requirements for the year. The remainder comprises the number of available vacation days. Should the remainder be negative, a zero number of vacation days is assigned at step 64. Using the adjust requirements function 52, a user may alter the number of vacation days allowed for a particular day or group of days as desired.

Figure 4:
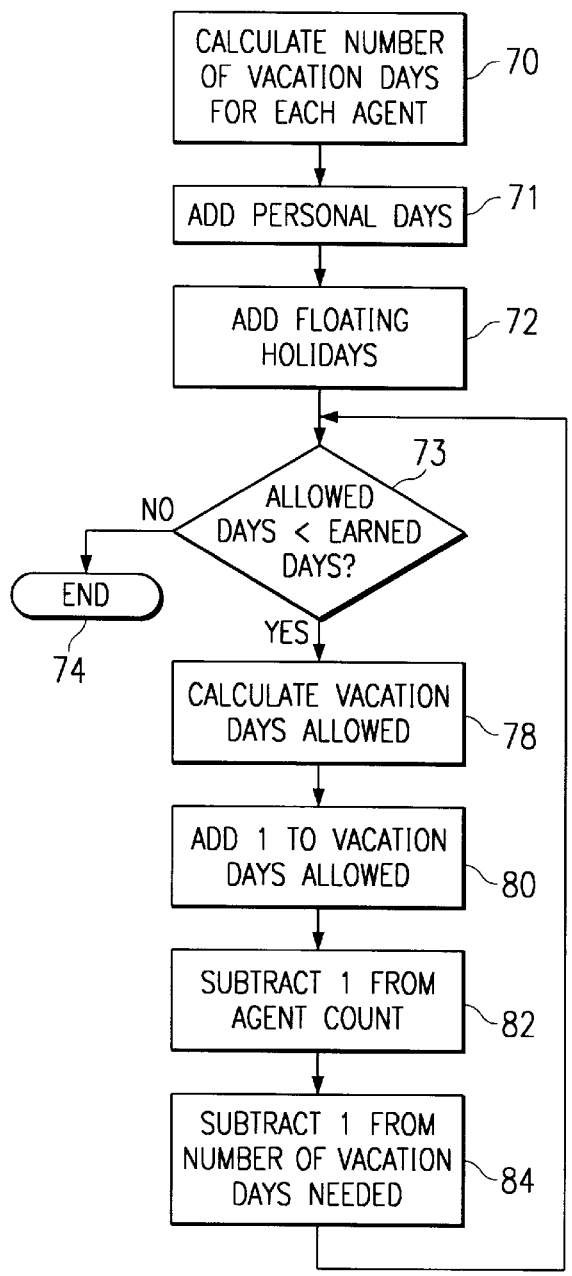
FIG. 4 is a flow chart illustrating the method for calculating the number of vacation days available to an agent.

Referring back to FIG. 2, the calculate vacation days object 28 provides means for generating the number of vacation days earned by each agent for the business in the manner shown in FIG. 4. Initially, the number of vacation days earned for each agent is calculated at step 70. The total number of earned vacation days are determined using cutoff date, seniority date and vacation table information. Next, personal days are added at step 71 to the total number of vacation days allowed. The total number of floating holidays is further added at step 72 to the number of vacation days. Inquiry step 73 compares the total number of earned vacation days to the number of allowed vacation days determined by the MU allocation functions 48 of the plan object 26. If the number of allowed vacation days is greater than the number of earned vacation days, then the procedure ends at step 74 since all employees will be able to take their vacation days and the MU will be fully staffed. Otherwise, a second pass of the data is performed to reallocate the total number of vacation days allowed since vacation days earned have priority over the number of vacation days allowed. The number of vacation days allowed is calculated at step 78 by subtracting requirements from the agent count. One day of vacation is added at step 80 to the total number of vacation days allowed. One is subtracted from the total agent count at step 82 and from the number of days needed at step 84. Control passes back to inquiry step 73 to determine if additional vacation days are still needed to meet the number vacation days earned. If so, control proceeds back to step 78 for an additional reallocation pass. Otherwise, the procedure ends at step 74.

Referring again to FIG. 2, the agent vacation profile object 30 generates vacation profiles for each agent within a management unit for a selected vacation year. The agent vacation profiles consist of identifying data and detailed vacation and holiday data for each agent. FIG. 5 illustrates an agent vacation profile screen. The agent vacation profile screen comprises several different columns containing information describing each agent within a selected management unit. The agent number column 92, agent name column 94, seniority date column 96 and seniority date extension column 98 comprise the agent identification information. This data may not be changed. The agent password column indicates the password used for enabling an agent access to the bidding object 32. Passwords may be preassigned by entering the password into the appropriate cell for each agents or by allowing the agent to enter their own password during the vacation/holiday bidding process. Each agent's password must be unique for a selected management unit. The work shift week 102 indicates the working shift to which an agent is assigned, and the work week days 104 indicate the number of days included within the work shift.

The vacation/holiday bidding object 32, FIG. 2, provides the functionality for carrying out vacation and holiday bidding. Upon selection of the bidding object 32, the user is provided with the option of selecting at 110 from an agent list. The agent list may be sorted by seniority date or agent name. The agents must bid in seniority date order. That is, the agent with rank order number 1 must bid first, followed by the agent with the rank order number 2, and so on. Should an agent attempt to bid for vacation days out of seniority order, an error message is provided. Upon selection of an agent name, the bidder is required to enter a password associated with the agent name at 112. Upon successful validation of the password, entry into the vacation/bidding utilities 114 is provided.

The summary function 116 provides a display as shown in FIG. 6 summarizing the relevant vacation data for a particular agent. The ID summary block 118 provides the name of the agent, vacation year being bid upon, the shift and times worked by the selected agent. The vacation/holiday summary block 120 provides a complete summary of the total number of vacation days, holidays and alternate vacation days; and the number of vacation and holidays earned selected, taken and remaining with respect to the selected agent. The holiday requirements summary block 122 provides a description of the various holidays, the agent requirements for those holidays and the number of requests to work or not work on holidays which have been requested by other agents to this point.

Figure 7:
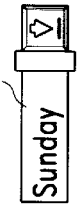
FIG. 7 is a representation of the Vacation Days Selection screen.

The calendar function 124, FIG. 2, provides a user with a complete view of the vacation calendar year as shown in FIG. 7. From this calendar, the user is able to select vacation days from those indicated as being available. By pointing and clicking on entity selection box 126, a user is able to select between vacation days, holidays, or alternate vacation days. Selection from the entity selection box 126 alters the update boxes 128 illustrating the total number of days, the number of days selected and the number of days remaining. The first day of the week selection box 130 allows the user to view the vacation calendars with different first days of the week. The example shown in FIG. 7 illustrates a week running Sunday through Saturday. Alternatively, weeks might be indicated to run Monday through Sunday, or Saturday through Friday.

Selection period icons 132 allow the user to select vacation periods of a week 132a, day 132b or partial day 132c. When the week icon 132a is selected, the calendar display 136 is altered to indicate weeks which may be selected or deselected by the user as vacation days. The operation occurs in a similar manner when either the full day or partial day period options are chosen. The vacation calendars are displayed having a variety of different colors to indicate status of particular days on calendar. The colors are indicative of several conditions including, (1) a day is not available to be selected, (2) the day is available to be selected, (3) partial day vacation selected, (4) all day vacation selected, (5) holiday, (6) office closed, and (7) alternate vacation day.

It should be appreciated by those skilled in the art that the specific embodiments disclosed above may be readily utilized as a basis for modifying or designing other structures for carrying out the purposes of the present invention. It should also be realized by those skilled in the art that such equivalent constructions do not depart from the spirit and scope of the invention as set forth in the appended claims.

I claim:

1. A vacation and holiday scheduling system, comprising:
    a graphical user interface for providing user access to the system;
    means for entering staffing requirements for a business;
    means for determining a number of vacation days earned by employees of the business and for determining the number of vacation days allowable to the employees for each day of a vacation year based upon the staffing requirements of the business; and
    bidding means enabling an employee to bid upon desired vacation days based upon the employee's earned vacation days, the allowable vacation days for each day of the vacation year and seniority of the employee, the bidding means preventing entry of an employee's bid until the bids of all higher priority employees have been entered.

2. The system of claim 1 further including means for altering the means by which employees bid on vacation days and by which vacation days earned and allowable are calculated.

3. The system of claim 2 wherein the means for altering further includes means for establishing the work shifts occurring throughout a workday.

4. The system of claim 3 further including means for establishing peak employee staffing requirements for the work shifts.

5. The system of claim 2 wherein the means for altering further includes means for defining holidays recognized by the system.

6. The system of claim 1 further including means for generating a vacation profile for each employee of a business, the vacation profile comprising a compilation of information on an employee's work and vacation schedule.

7. The system of claim 1 wherein the means for altering further includes means for creating management units representing a grouping of the employees of the business.

8. The system of claim 7 further including means for establishing a set of vacation scheduling rules associated with each management unit.

9. The system of claim 1 wherein the means for entering further includes means for downloading the staffing requirements from an external source.

10. The system of claim 1 wherein the means for entering further includes means for revising the entered staffing requirements via the graphical user interface.

11. The system of claim 1 wherein the means for entering further includes means for forecasting future staffing requirements from the entered staffing requirements.

12. The system of claim 1 wherein the means for entering further includes means for allocating the entered staffing requirements to selected groupings within the business.

13. The system of claim 1 wherein the bidding means further includes means for displaying on the graphical user interface a calendar from which an employee selects vacation days, units on the calendar being coded to indicate availability of particular days for vacation day selection.

14. A vacation and holiday scheduling system as in claim 1 wherein priority of employees is determined by seniority.

15. A method for scheduling employee vacations while meeting staffing requirements of a business, comprising the steps of:

determining staffing requirements for each day of a vacation year;

determining maximum allowable number of vacation days for each day of a vacation year;

determining earned vacation days for each employee of the business;

bidding on desired vacation days by the employees in the order of the employee's priority, the bidding preventing entry of an employee's bid until the bids of all higher priority employees have been entered; and assigning vacation days in response to employee seniority, allowable number of vacation days and earned vacation days.

16. A method for scheduling employee vacations as in claim 15 wherein priority of employees is determined by seniority.

17. A computer program having data structures included on a computer readable medium which enables an interactive vacation and holiday scheduling system comprising:

management controlled means for entering staffing requests for a business;

means for determining a number of vacation days earned by employees of the business and for determining the number of vacation days allowable to the employees for each day of a vacation year based upon the staffing requirements of the business; and bidding means enabling an employee to bid upon desired vacation days based upon the employee's earned vacation days, the allowable vacation days for each day of the vacation year and seniority of the employee, the bidding means preventing entry of an employee's bid until the bids of all higher priority employees have been entered.

18. The computer program according to claim 17 further including:

means for generating a vacation profile for each employee, said vacation profile providing a compilation of employee specific work and vacation schedule information.

19. The computer program according to claim 18 wherein said means for bidding further includes means for displaying a calendar, having units with selectability status shown, from which said employee indicates employee choices.

20. A computer program as in claim 17 wherein priority of employees is determined by seniority.

* * * * *

UNITED STATES PATENT AND TRADEMARK OFFICE
CERTIFICATE OF CORRECTION

PATENT NO. : 6,192,346 B1 Page 1 of 1
DATED : February 20, 2001
INVENTOR(S) : Green It is certified that error appears in the above-identified patent and that said Letters Patent is hereby corrected as shown below:

<u>Column 4,</u>
Line 9, delete "(8u)" insert -- (BU) --

<u>Column 5,</u>
Line 50, delete "agents" insert -- agent --
Line 50, delete "agent" insert -- agents --
Line 50, delete "password" insert -- passwords --

Signed and Sealed this

Eighth Day of January, 2002

Attest:

JAMES E. ROGAN
*Attesting Officer*     *Director of the United States Patent and Trademark Office*